United States Patent
Chu

(10) Patent No.: US 9,236,730 B2
(45) Date of Patent: Jan. 12, 2016

(54) INTEGRATED CIRCUIT WITH PROTECTION FUNCTION

(71) Applicant: Nuvoton Technology Corporation, Hsinchu (TW)

(72) Inventor: Ping-Ying Chu, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 25 days.

(21) Appl. No.: 14/166,178

(22) Filed: Jan. 28, 2014

(65) Prior Publication Data

US 2015/0085416 A1 Mar. 26, 2015

(30) Foreign Application Priority Data

Sep. 24, 2013 (TW) .............................. 102134237 A

(51) Int. Cl.
| H02H 3/00 | (2006.01) |
| H02H 9/02 | (2006.01) |
| H02H 3/02 | (2006.01) |
| H02H 3/087 | (2006.01) |
| H02H 5/04 | (2006.01) |
| H02H 3/08 | (2006.01) |

(52) U.S. Cl.
CPC .............. *H02H 9/025* (2013.01); *H02H 3/025* (2013.01); *H02H 3/087* (2013.01); *H02H 5/041* (2013.01); *H02H 5/042* (2013.01); *H02H 9/026* (2013.01); *H02H 3/08* (2013.01)

(58) Field of Classification Search
USPC ..................................... 361/86–87, 93.7–93.9
See application file for complete search history.

(56) References Cited

U.S. PATENT DOCUMENTS

| 5,498,984 | A | 3/1996 | Schaffer | |
| 5,555,725 | A * | 9/1996 | Shimasaki et al. | 60/277 |
| 5,675,480 | A | 10/1997 | Stanford | |
| 6,121,693 | A | 9/2000 | Rock | |
| 7,339,772 | B2 | 3/2008 | Ochi | |
| 8,030,719 | B2 | 10/2011 | Li et al. | |
| 8,390,151 | B2 * | 3/2013 | Rozman et al. | 307/140 |
| 2007/0285863 | A1 * | 12/2007 | Itoh | 361/93.1 |
| 2010/0164452 | A1 | 7/2010 | Ruan et al. | |
| 2011/0279930 | A1 | 11/2011 | Lin | |
| 2012/0098517 | A1 * | 4/2012 | Esumi et al. | 323/311 |

FOREIGN PATENT DOCUMENTS

TW M389996 U1 10/2010

OTHER PUBLICATIONS

"I²C Battery Gas Gauges," Linear Technology, pp. 1-2 (Mar. 2010).
(Continued)

*Primary Examiner* — Danny Nguyen
(74) *Attorney, Agent, or Firm* — Muncy, Geissler, Olds & Lowe, P.C.

(57) ABSTRACT

An integrated circuit generating a driving signal to a load according to an input voltage and including an impedance switching unit, a first protection unit, a first detection unit and a control unit is disclosed. The impedance switching unit takes the input voltage as the driving signal according to a control signal. The first protection unit generates a first detection signal when a current passing through the impedance switching unit is higher than a predetermined current. The first detection unit detects a voltage of the impedance switching unit to generate a detection result. The control unit controls the control signal according to the first detection signal.

19 Claims, 5 Drawing Sheets

(56) References Cited

OTHER PUBLICATIONS

"LTC2942-1, 1A battery Gas Gauge with Internal Sense Resistor and Temperature/Voltage Measurement," Linear Technology, pp. 1-16 (Mar. 2010).

"Maxim Precision, High-Side Current-Sense Amplifiers," pp. 1-13 (Dec. 1996).
"Low-Input-Voltage Current-Limited Load Switches with Shut Off and Auto-Restart Feature," Texas Instruments, pp. 1-21 (Nov. 2008).
TW Office Action date Apr. 10, 2015.

* cited by examiner

US 9,236,730 B2

INTEGRATED CIRCUIT WITH PROTECTION FUNCTION

CROSS REFERENCE TO RELATED APPLICATIONS

This application claims priority of Taiwan Patent Application No. 102134237, filed on Sep. 24, 2013, the entirety of which is incorporated by reference herein.

BACKGROUND OF THE INVENTION

1. Field of the Invention

The invention relates to an integrated circuit, and more particularly to an integrated circuit that is capable of measuring current, to avoid over-current or over-temperature.

2. Description of the Related Art

With the development of semiconductor technology, numerous circuits are integrated into an integrated circuit (IC). Therefore, the functions and types of electronic product have increased. The size of the electronic product is not increased when functions and types of electronic product have increased. However, when the size of an electronic product is small, the components in the electronic product cannot accept a large current. When receiving a large current, the components are damaged.

BRIEF SUMMARY OF THE INVENTION

In accordance with an embodiment, an integrated circuit generates a driving signal to a load according to an input voltage and includes an impedance switching unit, a first protection unit, a first detection unit and a control unit. The impedance switching unit takes the input voltage as the driving signal according to a control signal. The first protection unit generates a first detection signal when a current passing through the impedance switching unit is higher than a predetermined current. The first detection unit detects a voltage of the impedance switching unit to generate a detection result. The control unit controls the control signal according to the first detection signal.

In accordance with another embodiment, an integrated circuit generates a driving signal to a load according to an input voltage and includes an impedance switching unit, a first protection unit, a first detection unit and a control unit. The impedance switching unit takes the input voltage as the driving signal according to a control signal. The first protection unit detects an internal temperature of the integrated circuit. When the internal temperature is higher than a predetermined temperature, the first protection unit generates a first detection signal. The first detection unit detects a voltage of the impedance switching unit to generate a detection result. The control unit controls the control signal according to the first detection signal.

An operation system is also provided. An exemplary embodiment of an operation system includes a first integrated circuit, a load and a second integrated circuit. The first integrated circuit includes an impedance switching unit, a first protection unit, a first detection unit and a control unit. The impedance switching unit takes an input voltage as a driving signal according to a control signal. The first protection unit generates a first detection signal when a current passing through the impedance switching unit is higher than a predetermined current. The first detection unit detects a voltage of the impedance switching unit to generate a detection result. The control unit controls the control signal according to the first detection signal. The load operates according to the driving signal. The second integrated circuit receives the detection result to calculate a power consumption of the load.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
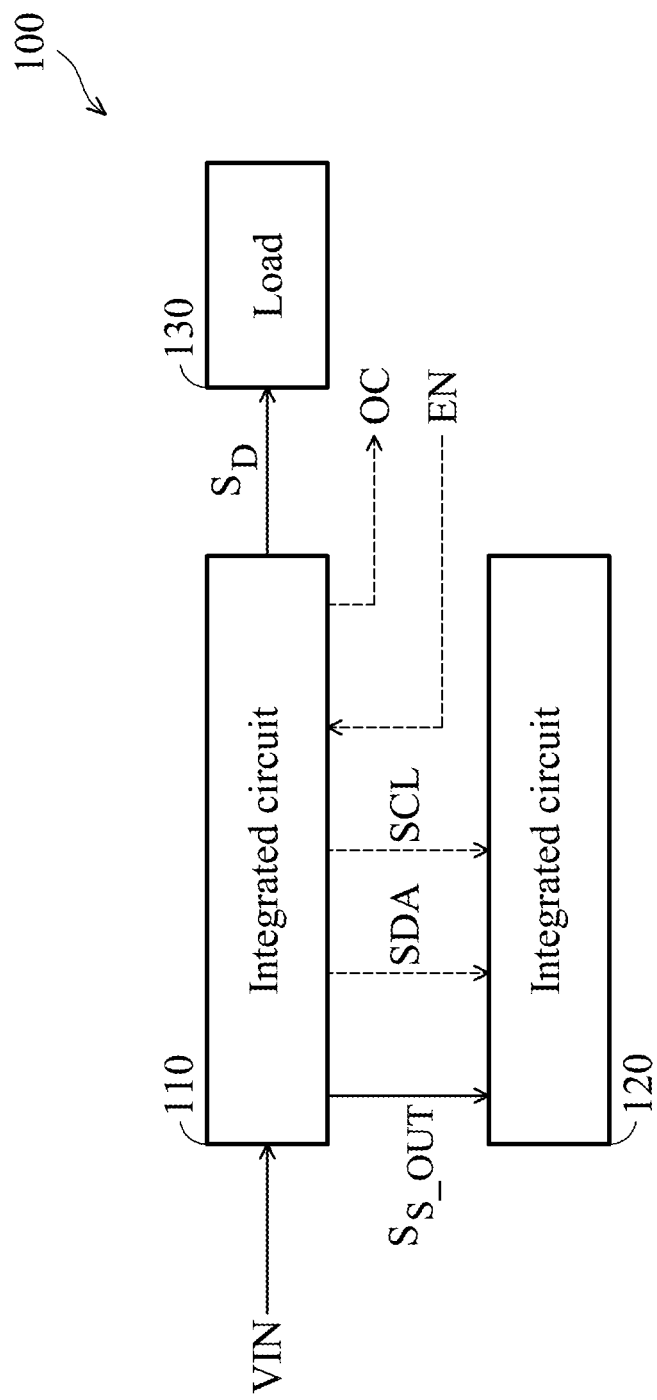
FIG. 1 is a schematic diagram of an exemplary embodiment of an operation system, in accordance with some embodiments.

FIG. 1 is a schematic diagram of an exemplary embodiment of an operation system, in accordance with some embodiments. The operation system 100 includes integrated circuits 110, 120 and a load 130. The integrated circuit 110 receives an input voltage VIN and generates a driving signal $S_D$ according to the input voltage VIN. The load 130 operates according to the driving signal $S_D$. In one embodiment, the integrated circuit 110 has a transmittal path (not shown) to transmit the input voltage VIN. The input voltage VIN serves as the driving signal $S_D$.

In this embodiment, when the current passing through the transmittal path is too large, the integrated circuit 110 stops providing the driving signal $S_D$ to the load 130 to avoid damaging the load 130. Additionally, when the current passing through the transmittal path of the integrated circuit 110 is too large, the integrated circuit 110 outputs a aver-current signal OC to an external device (not shown).

In another embodiment, the integrated circuit 110 detects the current passing through the transmittal path to generate a detection result $S_{S\_OUT}$ and provides the detection result $S_{S\_OUT}$ to an external controller, such as the integrated circuit 120. In one embodiment, the integrated circuit 120 obtains the power consumption of the load 130 according to the detection result $S_{S\_OUT}$ and the input voltage VIN. In this embodiment, the detection result $S_{S\_OUT}$ is a voltage level.

In another embodiment, the integrated circuit 110 generates a clock signal SCL and a data signal SDA according to the detect on result $S_{S\_OUT}$ and provides the clock signal SCL and the data signal SDA to the integrated circuit 120 according to a communication protocol, such as I2C, but the disclosure is not limited thereto. The invention does not limit the kind of communication protocol between the integrated circuit 110 and the integrated circuit 120. In this embodiment, the detection result $S_{S\_OUT}$ is an analog signal and the data signal SDA is a digital signal. In some embodiments, the integrated circuit generates a clock signal and a plurality of data signals according to the detection result $S_{S\_OUT}$ and provides the clock signal and the data signals to the integrated circuit 120 according to a specific communication protocol. In other embodiments, an external device (not shown) provides an activating signal EN to activate the integrated circuit 110.

Figure 2A:
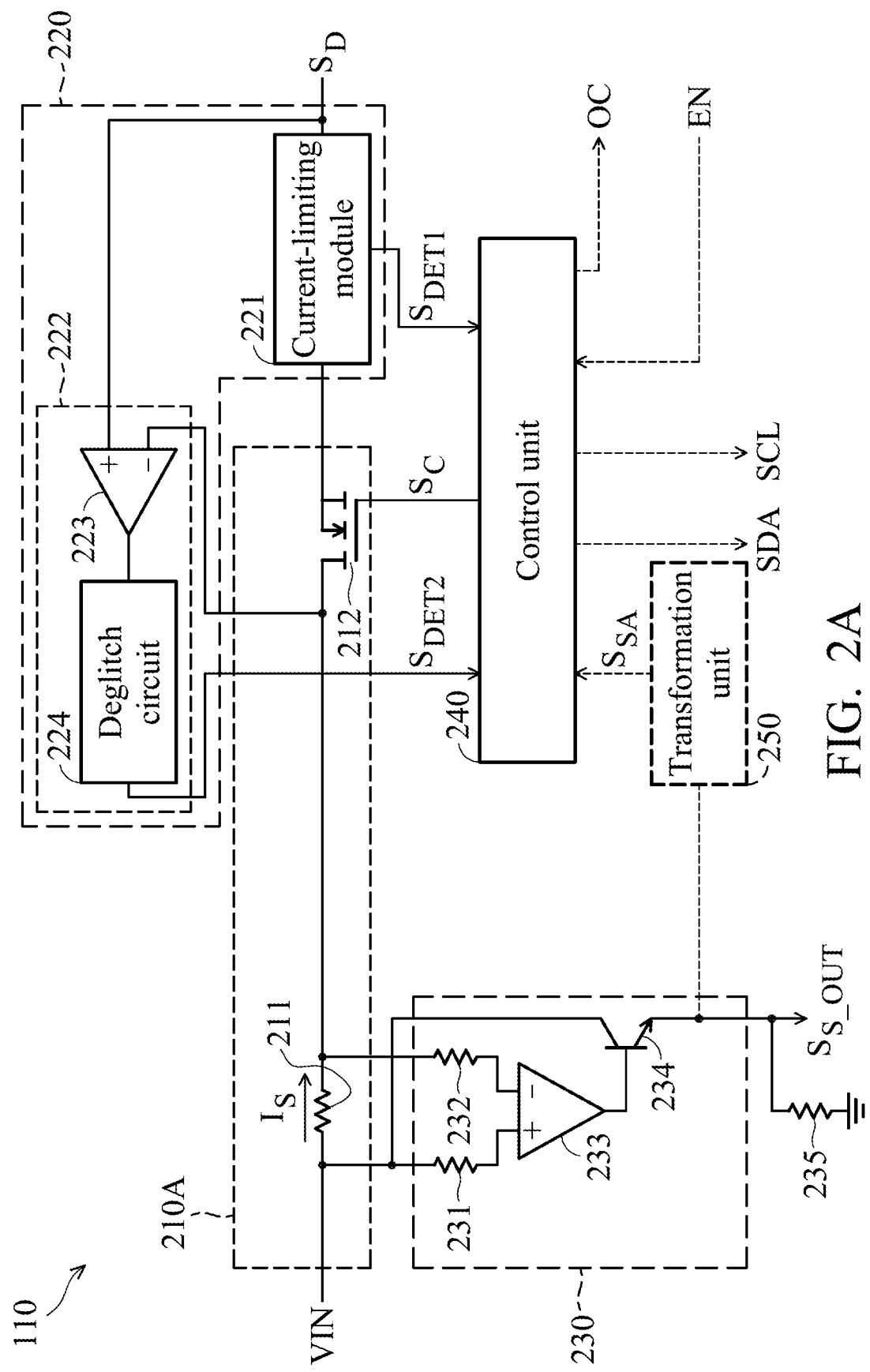
FIGS. 2A and 2B are schematic diagrams of exemplary embodiments of an integrated circuit, in accordance with some embodiments.

FIG. 2A is a schematic diagram of an exemplary embodiment of an integrated circuit, in accordance with some embodiments. The integrated circuit 110 includes an impedance switching unit 210A, a protection unit 220, a detection unit 230 and a control unit 240. The impedance switching unit 210A provides a transmittal path and takes the input voltage VIN as the driving signal $S_D$ according to a control signal $S_C$.

In this embodiment, the impedance switching unit 210A includes an impedance unit 211 and a transistor 212. The invention does not limit the kind of impedance unit 211. In this embodiment, the impedance unit 211 is a resistor. The transistor 212 receives the control signal $S_C$ and is connected to the impedance unit 211 in serial. In this embodiment, the transistor 212 is an N-type transistor, but the disclosure is not limited thereto. In other embodiments, the transistor 212 is a P-type transistor.

When the current $I_S$ passing through the impedance switching unit 210A is higher than a predetermined current, the protection unit 220 generates a detection signal $S_{DET1}$. The control unit 240 controls the control signal $S_C$ according to the detection signal $S_{DET1}$. In one embodiment, the control unit 240 utilizes the control signal $S_C$ to turn off the transistor 212 such that the load 130 cannot receive the driving signal $S_D$. Therefore, when the current required by the load 130 is too large, the impedance unit 211 is not damaged. In this embodiment, the protection unit 220 includes a current-limiting module 221. The current-limiting module 221 is configured to generate the detection signal $S_{DET1}$.

In another embodiment, the protection unit 220 further includes a glitch-protection module 222. When the duration of operation during, which the current Is passing through the impedance switching unit 210A is larger than the predetermined current, arrives at a predetermined time, the glitch-protection module 222 generates a detection signal $S_{DET2}$. The control unit 240 controls the control signal Sc according to the detection signal $S_{DET2}$ to turn off the transistor 212. Therefore, when the the current $I_S$ is too larger, the impedance unit 211 is not damaged. The integrated circuit 110 stops providing the driving signal $S_D$ to the load 130. In this embodiment, the glitch-protection module 222 includes a comparator 223 and a deglitch circuit 224.

The comparator 223 receives a pulse passing through the impedance switching unit 210A. The deglitch circuit 224 determines whether the duration of operation during, which the pulse passes through the impedance switching unit 210A, is larger than a predetermined time. If the duration during, which the pulse passes through the impedance switching unit 210A, is not larger than the predetermined time, the deglitch circuit 224 ignores the pulse passing through the impedance switching unit 210A. If the duration during, which the pulse passes through the impedance switching unit 210A, is larger than the predetermined time, the deglitch circuit 224 generates the detection signal $S_{DET2}$.

The detection unit 230 detects the voltage of the impedance switching unit 210A to generate the detection result $S_{S\_OUT}$. In this embodiment, the detection unit 230 detects the voltage crossing the impedance unit 211 and generates the detection result $S_{S\_OUT}$ according to the voltage crossing the impedance unit 211. The invention does not limit the circuit structure of the detection unit 230. In one embodiment, the detection unit 230 includes resistors 231, 232, a comparator 233 and a transistor 234.

The resistor 231 is coupled between a terminal of the impedance unit 211 and a non-inverting input of the comparator 233. The resistor 232 is coupled between another terminal of the impedance unit 211 and an inverting input of the comparator 233. The transistor 234 is coupled to the resistor 231 and generates the detection result Ss our according to an output signal of the comparator 233. In this embodiment, the transistor 234 is an npn transistor, but the disclosure is not limited thereto. In other embodiments, the transistor 234 is other types.

In this embodiment, the detection result $S_{S\_OUT}=I_S R_{211} R_{235}/R_{231}$, wherein $I_S$ is the current passing through the impedance unit 211, $R_{211}$ is the impedance value of the impedance unit 211, $R_{235}$ is the impedance value of the resistor 235, and $R_{231}$ is the impedance value of the resistor 231. Since the detection result $S_{S\_OUT}$ and impedance values $R_{211}$, $R_{235}$ and $R_{231}$ are known, an external integrated circuit is capable of using the detection result $S_{S\_OUT}$ and impedance values $R_{211}$, $R_{235}$ and $R_{231}$ to calculate the current $I_S$ passing through the impedance unit 211.

In this embodiment, the integrated circuit 110 further includes a transformation unit 250. The transformation unit 250 transforms the detection result Ss our to generate a transforming signal $S_{SA}$. The control unit 240 generates the data signal $S_{S\_OUT}$ and the clock signal SCL to an external controller according to the transforming signal. In one embodiment, the external controller is the integrated circuit 120. In this case, the integrated circuit 120 receives the detection result $S_{S\_OUT}$ or having an analog format, meanwhile, the integrated circuit 120 receives the data signal SDA having a digital format according to the clock signal SCL, but the disclosure is not limited thereto. The invention does not limit how the integrated circuit 110 communicates with the integrated circuit 120. In one embodiment, the integrated circuit 110 generates a clock signal and numerous data signals according to the detection result $S_{S\_OUT}$ our and provides the clock signal and the data signals to the integrated circuit 120 according to a specific communication protocol.

Figure 2B:
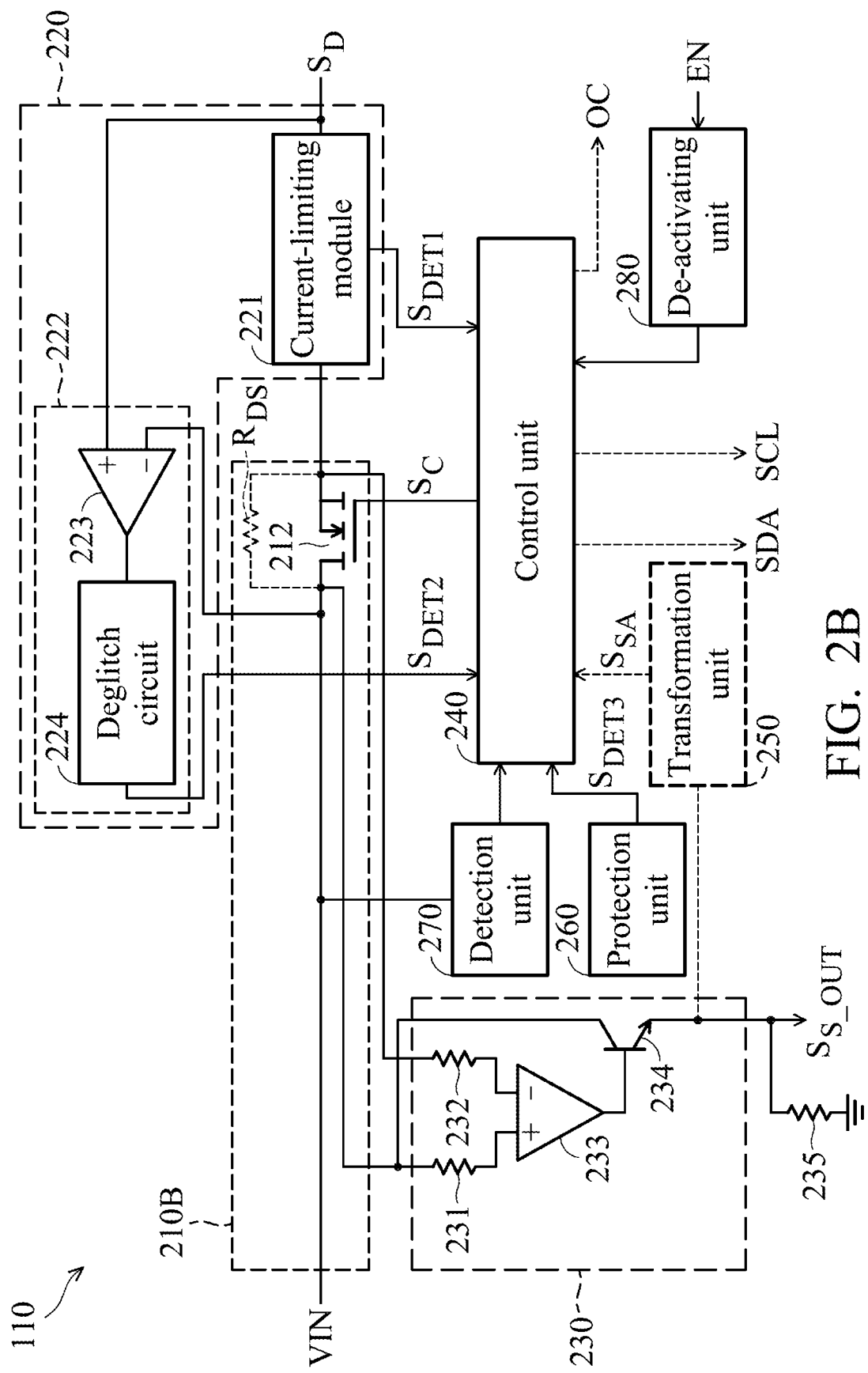

FIG. 2B is a schematic diagram of another exemplary embodiment of an integrated circuit, in accordance with some embodiments. FIG. 2B is similar to FIG. 2A except for impedance switching unit 210B. In this embodiment, the impedance switching unit 210B includes a transistor 212. The detection unit 230 detects the voltage crossing an equivalent resistor $R_{DS}$ formed between the drain and the source of the transistor 212 and generates the detection result $S_{S\_OUT}$ according to the voltage crossing the equivalent resistor $R_{DS}$. In this embodiment, the impedance unit 211 shown in FIG. 2A is replaced with the equivalent resistor $R_{DS}$ of the transistor 212.

In one embodiment, the integrated circuit 120 calculates the current passing through the equivalent resistor $R_{DS}$ according to the detection result $S_{S\_OUT}$, the internal temperature of the integrated circuit 110 and the input voltage VIN. Additionally, the operations of the protection unit 220, the detection unit 230 and the transformation unit 250 shown in FIG. 2B are the same as the operations of the protection unit 220, the detection unit 230 and the transformation unit 250 showing in FIG. 2A such that the descriptions of FIG. 2B is omitted for brevity. Further, FIG. 2B includes a protection unit 260, a detection unit 270 and a de-activating unit 280.

The protection unit 260 detects the internal temperature of the integrated circuit 110. The invention does not limit the circuit structure of the protection unit 260. Any circuit can serve as the protection unit 260, as long as the circuit is capable of detecting temperature. In one embodiment, the protection unit 260 includes a temperature sensor. When the internal temperature of the integrated circuit 110 is higher than a predetermined temperature, the protection unit 260 generates a detection signal $S_{DET3}$. In one embodiment, the control unit 240 controls the control signal $S_C$ to turn off the transistor 212 according to the detection signal $S_{DET3}$. Thus, the integrated circuit 110 stops providing the driving signal $S_D$ to the load 130 to avoid that the transistor 212 is damaged.

The detection unit 270 detects the level of the input voltage VIN. The invention does not limit the circuit structure of the detection unit 270. Any circuit can serve as the detection unit 270, as long as the circuit is capable of detecting voltage level. In one embodiment, the detection unit 270 is a voltage detector. When the input voltage VIN is less than a predetermined voltage, the detection unit 270 de-activates the control unit 240.

The de-activating unit 280 de-activates or activates the control unit 240 according to an external activating signal EN. For example, when the external activating signal EN is at a first level, the de-activating unit 280 generates a de-activating signal such that the control unit 240 stops operating. When the external activating signal EN is at a second level, the de-activating unit 280 generates an activating signal to activate the control unit 240. In one embodiment, the first level may be a ground level and the second level may be a high level, such as 3.3V. In another embodiment, the second level may be a ground level and the first level may be a high level, such as 3.3V. The invention does not limit the circuit structure of the de-activating unit 280. In one embodiment, the de-activating unit 280 is constituted by logic circuits.

In some embodiments, at least one of the protection unit 260, the detection unit 270 and the de-activating unit 280 can be omitted. Furthermore, at least one of the protection unit 260, the detection unit 270 and the de-activating unit 280 can be applied to the integrated circuit 110 shown in FIG. 2A. Additionally, the impedance switching unit 210A shown in FIG. 2A can be replaced by the impedance switching unit 210B shown in FIG. 2B.

Figure 3A:
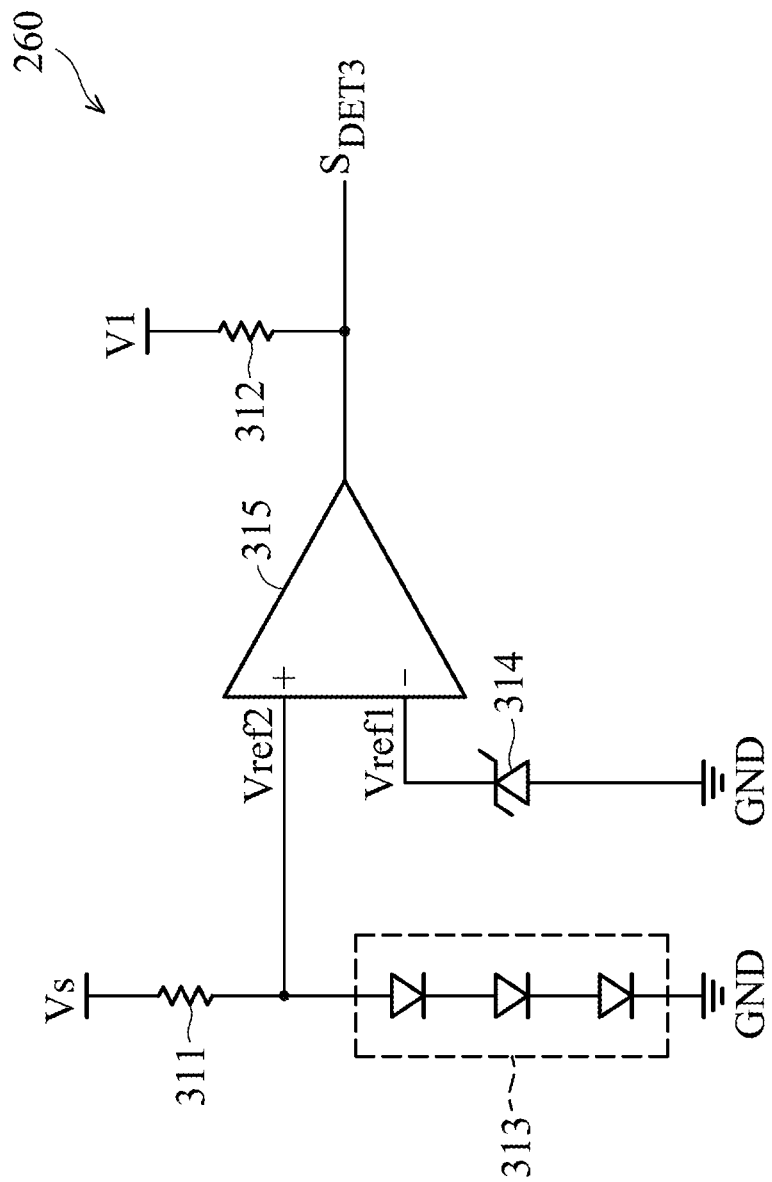
FIGS. 3A and 3B are schematic diagrams of exemplary embodiments of a protection unit, in accordance with some embodiments.

FIG. 3A is a schematic diagram of an exemplary embodiment of a protection unit, in accordance with some embodiments. The protection unit 260 includes resistors 311, 312, a heat sensor 313, a zener diode 314 and a comparator 315. The resistor 311 receives the voltage Vs and is coupled to the non-inverting input of the comparator 315. The resistor 312 receives the voltage V1 to pull-up the level of the output terminal of the comparator 315.

The heat sensor 313 is coupled to the non-inverting input of the comparator 315. In this embodiment, the heat sensor 313 includes numerous temperature-sensing diodes, but the disclosure is not limited thereto. Any element can serve as the heat sensor, as long as the element is capable of detecting temperature. For example, the heat sensor 313 is constituted by thermal resistors. Additionally, the cathode of the zener diode 314 is coupled to the inverting input of the comparator 315. The anode of the zener diode 314 receives a ground level GND to provide a reference voltage Vref1. The output level of the comparator 315 is served as the detection signal $S_{DET3}$.

When the temperature of the integrated circuit 110 is increased, the voltage Vref2 of the heat sensor 313 is changed. When the voltage Vref2 is higher than the reference voltage Vref1, it represents that the temperature of the integrated circuit 110 is not higher than a predetermined temperature. Therefore, the output level of the comparator 315 is a logic high level. When the voltage Vref2 is less than the reference voltage Vref1, it represents that the temperature of the integrated circuit 110 is higher than the predetermined temperature. Therefore, the output level of the comparator 315 is a logic low level.

Figure 3B:
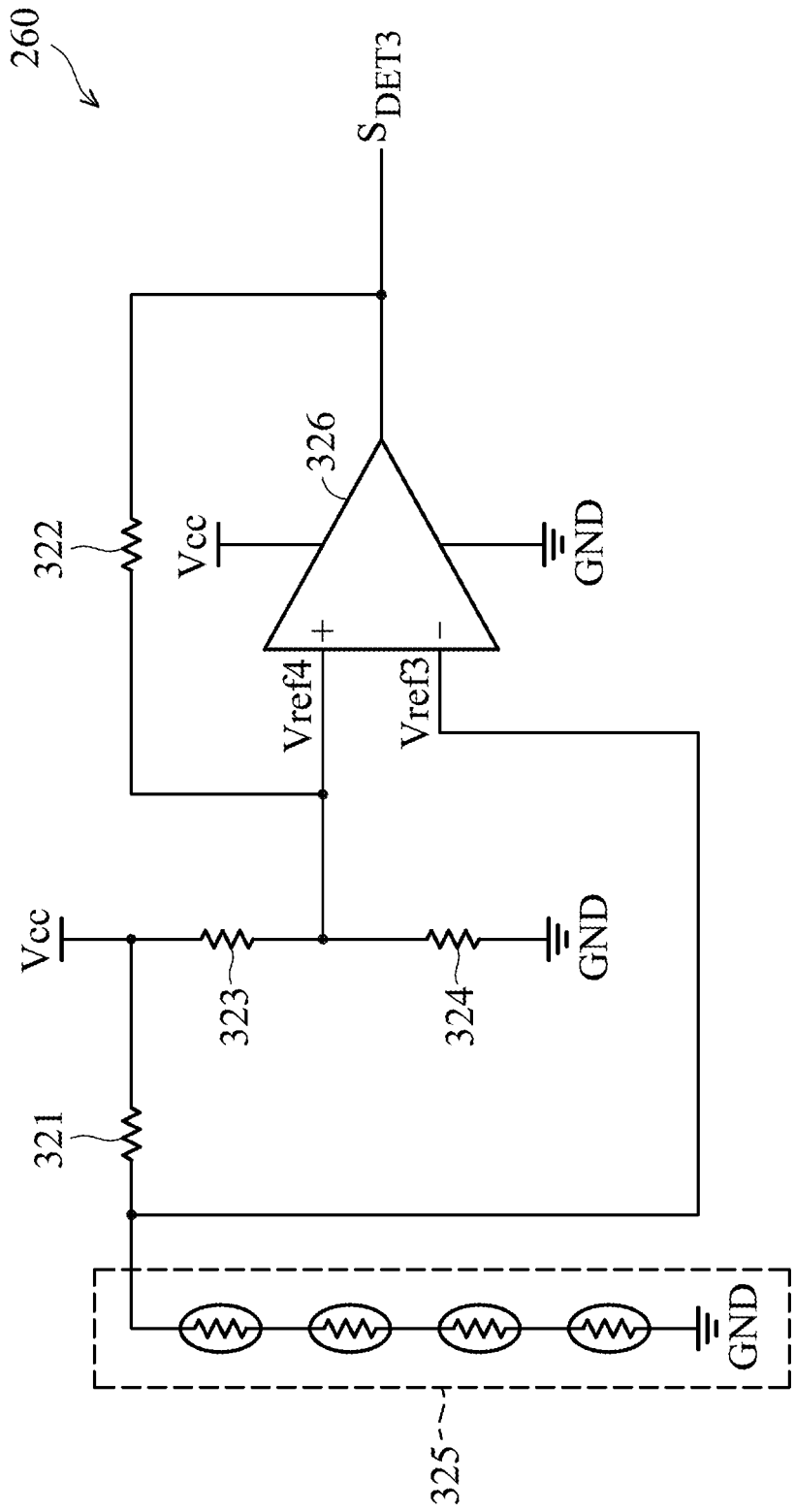

FIG. 3B is a schematic diagram of another exemplary embodiment of a protection unit, in accordance with some embodiments. The protection unit 260 includes resistors 321~324, a heat sensor 325 and a comparator 326. The comparator 326 generates the detection signal $S_{DET3}$ according to the voltages Vref3 and Vref4. Since the relationship of the resistors 321~324, the heat sensor 325 and the comparator 326 are shown in FIG. 3B, the descriptions are omitted.

In this embodiment, the heat sensor 325 is constituted by numerous thermal resistors. Each thermal resistor has a positive temperature coefficient (PCT) or a negative temperature coefficient (NTC).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit generating a driving signal to a load according to an input voltage, comprising:
    an impedance switching unit taking the input voltage as the driving signal according to a control signal and comprising a transistor, wherein an equivalent resistor is formed between a drain and a source of the transistor;
    a first protection unit generating a first detection signal when a current passing through the equivalent resistor is higher than a predetermined current;
    a first detection unit detecting a voltage of the impedance switching unit to generate a detection result; and
    a control unit generating the control signal according to the first detection signal.

2. The integrated circuit as claimed in claim 1, wherein the impedance switching unit comprises:
    an impedance unit connected to the transistor in serial, wherein the first detection unit detects a voltage crossing the impedance unit and generates the detection result according to the voltage crossing the impedance unit, wherein the transistor receives the control signal.

3. The integrated circuit as claimed in claim 1, wherein the control unit provides the detection result to an external controller.

4. The integrated circuit as claimed in claim 3, further comprising:
    a transformation unit transforming the detection result to generate a transforming signal, wherein the control unit generates a data signal and a clock signal to the external controller according to the transforming signal.

5. The integrated circuit as claimed in claim 4, wherein the detection result is an analog signal and the data signal is a digital signal.

6. The integrated circuit as claimed in claim 1, wherein the first protection unit comprises:
    a glitch-protection module generating a second detection signal when a duration during, which the current passing through the equivalent resistor is larger than the predetermined current, arrives at a predetermine time, and the control unit controls the control signal according to the first and the second detection signals.

7. The integrated circuit as claimed in claim 1, further comprising:
   a de-activating unit for de-activating or activating the control unit according to an external activating signal; and
   a second detection unit for de-activating the control unit when the input voltage is less than a predetermined voltage.

8. An integrated circuit generating a driving signal to a load according to an input voltage, comprising:
   an impedance switching unit taking the input voltage as the driving signal according to a control signal and comprising a transistor, wherein an equivalent resistor is formed between a drain and a source of the transistor;
   a first protection unit detecting an internal temperature of the integrated circuit, wherein when the internal temperature is higher than a predetermined temperature, the first protection unit generates a first detection signal;
   a second protection unit generating a second detection signal when a current passing through the equivalent resistor is higher than a predetermined current;
   a first detection unit detecting a voltage of the impedance switching unit to generate a detection result; and
   a control unit controlling the control signal according to the first detection signal and the second detection signal.

9. The integrated circuit as claimed in claim 8, wherein the transistor comprises a gate receiving the control signal, and the first detection unit detects a voltage between the drain and the source and generates the detection result according to the voltage.

10. The integrated circuit as claimed in claim 8, wherein the impedance switching unit comprises:
    an impedance unit connected to the transistor in serial, wherein the first detection unit detects a voltage crossing the impedance unit and generates the detection result according to the voltage crossing the impedance unit, and the transistor receives the control signal.

11. The integrated circuit as claimed in claim 8, wherein the control unit provides the detection result to an external controller.

12. The integrated circuit as claimed in claim 11, further comprising:
    a transformation unit transforming the detection result to generate a transforming signal, wherein the control unit generates a data signal and a clock signal to the external controller according to the transforming signal.

13. The integrated circuit as claimed in claim 12, wherein the detection result is an analog signal and the data signal is a digital signal.

14. The integrated circuit as claimed in claim 8, wherein the first protection unit comprises:
    a glitch-protection module generating a second detection signal when a duration during, which the current passing through the equivalent resistor is larger than the predetermined current, arrives at a predetermine time, and the control unit controls the control signal according to the first and the second detection signals.

15. The integrated circuit as claimed in claim 8, further comprising:
    a de-activating unit de-activating or activating the control unit according to an external activating signal; and
    a second detection unit de-activating the control unit when the input voltage is less than a predetermined voltage.

16. An operation system comprising:
    a first integrated circuit comprising:
    an impedance switching unit taking an input voltage as a driving signal according to a control signal and comprising a transistor, wherein an equivalent resistor is formed between a drain and a source of the transistor;
    a first protection unit generating a first detection signal when a current passing through the equivalent resistor is higher than a predetermined current;
    a first detection unit detecting a voltage of the impedance switching unit to generate a detection result; and
    a control unit generating the control signal according to the first detection signal;
    a load operating according to the driving signal; and
    a second integrated circuit receiving the detection result to calculate a power consumption of the load.

17. The operation system as claimed in claim 1, wherein the transistor comprises a gate receiving the control signal, the first detection unit detects a voltage between the drain and the source and generates the detection result according to the voltage.

18. The operation system as claimed in claim 1, wherein the impedance switching unit comprises:
    an impedance unit connected to the transistor in serial, wherein the first detection unit detects a voltage crossing the impedance unit and generates the detection result according to the voltage crossing the impedance unit, and the transistor receives the control signal.

19. An integrated circuit generating a driving signal to a load according to an input voltage and comprising:
    a transistor taking the input voltage as the driving signal according to a control signal and comprising a current input terminal and a current output terminal;
    a first protection unit generating a first detection signal when a current passing through the transistor;
    a first detection unit detecting a voltage between the current input terminal and the current output terminal to generate a detection result; and
    a control unit generating the control signal according to the first detection signal, wherein the control unit provides the detection result to an external controller, and the external controller uses the detection result and an impedance value of an equivalent resistor of the transistor to calculate a current passing through the transistor.

* * * * *